United States Patent [19]

Andersen

[11] 4,266,168

[45] May 5, 1981

[54] D.C. MOTOR SPEED CONTROL

[76] Inventor: Jorgen W. Andersen, 3030 Rey Rd., Mathews, N.C. 28105

[21] Appl. No.: 47,699

[22] Filed: Jun. 12, 1979

[51] Int. Cl.³ .............................................. H02P 5/16
[52] U.S. Cl. .................................... 318/331; 318/308; 318/636
[58] Field of Search ................ 318/331, 459, 636, 308

[56] References Cited

U.S. PATENT DOCUMENTS

| | | | |
|---|---|---|---|
| 3,515,971 | 6/1970 | Joslyn et al. | 318/308 |
| 3,671,835 | 6/1972 | McMenamy et al. | 318/308 |
| 3,708,737 | 1/1973 | Johnson | 318/331 |
| 3,818,297 | 6/1974 | Ha et al. | 318/331 |

*Primary Examiner*—David Smith, Jr.
*Attorney, Agent, or Firm*—Ferguson, Baker and Whitham

[57] ABSTRACT

A D.C. motor speed control uses the motor as both the prime mover and feedback element. The motor back e.m.f. is sampled periodically to generate a feedback signal which is not dependent on motor characteristics for the control loop dynamic response. An adaptive positive feedback control loop is employed.

4 Claims, 6 Drawing Figures

D.C. MOTOR SPEED CONTROL

FIELD OF THE INVENTION

The present invention is generally related to electric motor speed regulation, and more particularly to the use of permanent magnet or shunt-wound direct current motors, in combination with a sampling based control loop, as both the prime mover and the feedback element. The invention eliminates the need for a tachometer or other devices to provide shaft speed information and further obviates the need for a prior knowledge of the motor constants of the particular motor being used, making adjustments other than set speed unnecessary for successful speed control. The invention makes possible precise motor speed control over a wide range of set speeds while providing the motor load with full rated torque at all speeds. Applications include, but are not limited to, model railroad locomotive controls, wherein a plurality of different types of motors are encountered, portable tape recorders, precision speed control for D.C. to A.C. motor generators, and other such applications where the use of tachometers for feedback signals are either impractical or undesirable.

BRIEF DESCRIPTION OF THE DRAWINGS

The invention will be better understood from the following detailed description with reference to the accompanying drawings, in which.

DESCRIPTION OF THE PRIOR ART

Figure 1:
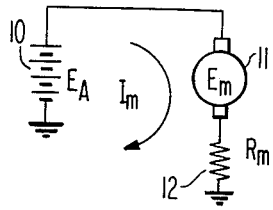
FIG. 1 is a simplified schematic diagram of a D.C. motor driven by a voltage source.

A permanent magnet or shunt-wound direct current motor driven by a voltage source such as a battery or regulated supply can be represented in simplified form in FIG. 1. More specifically, a battery 10 is connected in series with the motor armature 11 and resistor 12. The resistor 12 has a resistance $R_m$ which represents the motor armature, brush and contact resistance. The current through the motor for an applied voltage $E_A$ across the motor is $I_m$, and the motor produces a back e.m.f. of $E_m$. From this figure, the following relations can be written:

$$E_A = E_m + I_m R_m, \quad (1)$$

or alternatively:

$$E_A = K_V \omega + I_m R_m, \quad (2)$$

where $K_V$ is the motor back e.m.f. constant (volts/rpm) and $\omega$ is the armature speed in rpm. $K_V$ is a characteristic of the particular motor used.

Two points about the motors under consideration are worth mentioning: First, $K_V \omega$ is a linear relationship, and second, torque T is a linear function of motor current. More particularly, torque can be expressed as follows:

$$T = K_T I_m, \quad (3)$$

where $K_T$ is the motor torque constant (oz.-in./amp.) and is a characteristic of the particular motor used. Substituting $I_m$ from equation (3) into equation (2) results in the following equation:

$$E_A = \frac{T}{K_T} R_m + K_V \omega \quad (4)$$

Transposing and solving for $\omega$:

$$\omega = \frac{E_A}{K_T} - \frac{T}{K_V K_T} R_m, \quad (5)$$

wherein it is evident that as T increases, $\omega$ decreases. Solving equation (4) for T:

$$T = (E_A - K_V \omega) \frac{K_T}{R_m}. \quad (6)$$

Inspection of equations (5) and (6) reveals that motor speed regulation can be simply expressed as follows:

$$-\frac{R_m}{K_V K_T} = \frac{\delta \omega}{\delta T} \bigg| E_A = \text{constant}. \quad (7)$$

This is simply another way to say that as T increases in the ($TR_m/K_V K_T$) term of equation (5), the increase in $I_m R_m$ due to $T/K_T$ forces a change in $E_m$ by a factor of ($\Delta I_m R_m/K_V$).

To illustrate the point, consider the behavior of a high quality of 12 volt D.C. motor in the following example:

$R_m = 9.4 \Omega$ $K_V = 2.3 \text{m}V/\text{rpm}$ $K_T = 3.0$ oz.-in./amp.

friction torque, $T_F = 0.04$ oz.-in.

$E_A = 12.0$ volts

Under no load conditions including the effect of friction torque:

$$I_m = \frac{T_F}{K_T} = 13.33 \text{ mA}.$$

Solving for $I_m R_m$ and $E_m$:

$I_m R_m = 13.33 \times 10^{-3} \times 9.4 = 0.12533$ volts, and $E_m = E_A - I_m R_m = 12 - 0.12533 = 11.8747$ volts.

The no load speed is as follows:

$$\omega = \frac{E_m}{K_V} = \frac{11.8747}{2.3 \times 10^{-3}} = 5163 \text{ rpm}.$$

Now, examining the behavior of the same motor operating with an external load of 1 oz.-in.:

load torque, $T_L = 1$ oz.-in.

$$I_m = \frac{T_F + T_L}{K_T} = \frac{1.04}{3} = 0.34667 \text{ amps.}$$

Solving for $I_m R_m$ and $E_m$:

$$I_m R_m = 0.34667 \times 9.4 = 3.2587 \text{ volts, and}$$

$$E_m = E_A - I_m R_m = 12 - 3.2587 = 8.7413 \text{ volts.}$$

The motor speed is as follows:

$$\omega = \frac{E_m}{K_V} = \frac{8.7413}{2.3 \times 10^{-3}} = 3801 \text{ rpm.}$$

In the example given, the net change in speed due to loading is $-26.4\%$. The motor parameters used in the example are typical of a high quality instrumentation motor. Under conditions where the motor must drive less than perfect gear trains, eccentric loads and the like, it is easy to see that apparently erractic operation can result due to motor load/speed variations.

With reference again to equation (5), the $(TR_m/K_V K_T)$ term is entirely responsible for the load/speed variations just illustrated. If $R_m = 0$, no variation in speed due to loading would result. Using equation (1) and solving for $R_m$ results in the following:

$$R_m = \frac{E_A - E_m}{I_m} \tag{8}$$

Now, were one to cause $E_m \rightarrow E_A$ by feedback from $I_m$, the numerator would force the effective value of $R_m$ to approach zero.

Figure 2:
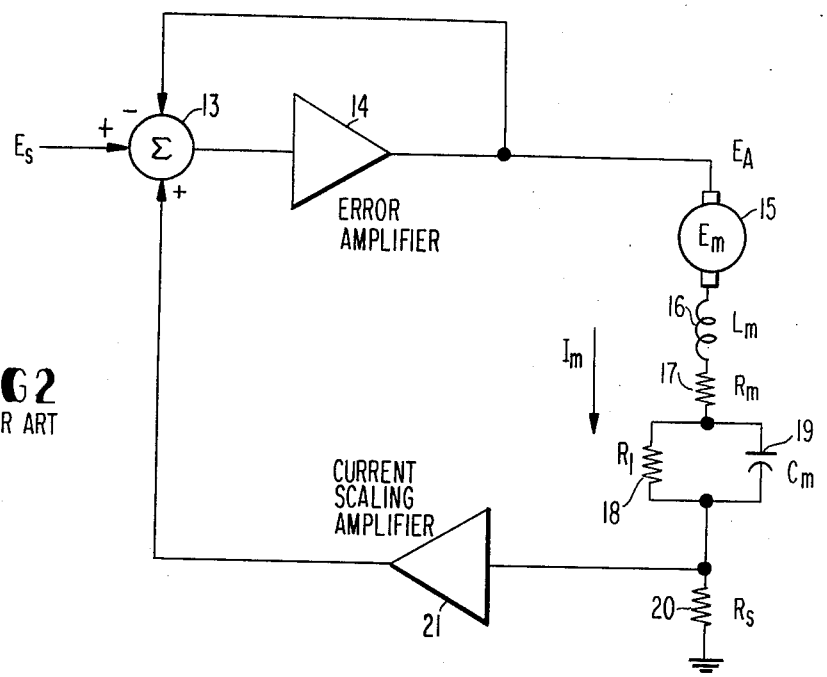
FIG. 2 is a block and schematic diagram of a prior art constant speed control.

Just such an approach has been proposed in the prior art. See for example Marco Siligoni, "Higher Integration for Tomorrows Cassette/Tape Recorders", *IEEE Transactions on Consumer Electronics*, February 1978, and S. Rajaram and S. Murugesan, "A New Method for speed Measurement/Control of D.C. Motors", *IEEE Transactions on Instrumentation and Measurement*, March 1978. This approach is illustrated in FIG. 2 which shows the feedback from $I_m$. In the figure, a set point voltage $E_S$ is applied to one input of summing junction 13, the output of which is an error voltage applied to the input of operational amplifier 14. Negative feedback is provided from the output of amplifier 14 to a second input of summing junction 13. Typically, the gain k of an operational amplifier is on the order of $10^5$ to $10^6$; therefore, for purposes of simplifying calculations the gain may be considered as $k \rightarrow \infty$. As a result, $E_A \rightarrow E_S$ and equation (8) can be rewritten as follows:

$$R_m = \frac{E_s - E_m}{I_m} \tag{9}$$

The output of amplifier 14 is connected to the series connection of motor 15, inductor 16 and resistor 17. The resistor 17 has a resistance value $R_m$ as defined before, while the inductor 16 has an inductance value $L_m$ which is the armature inductance. Resistor 17 is next connected to the parallel connection of resistor 18 and capacitor 19, and this parallel connection is in turn connected in series with resistor 20. Resistor 18 has a resistance value $R_1$ which is the electrical equivalent of the load, while capacitor 19 has a capacitance value $C_m$ which is the electrical equivalent of the armature and load inertia. Resistor 20 has a resistance value of $R_S$, which for ease of later calculations may be assumed to be 1 Ω, and is the current metering resistor for producing the feedback signal. A current scaling amplifier 21 develops a voltage proportional to $I_m$ for feedback to a third input of summing junction 13.

At steady-state, $R_1$ approximates a current sink and the effects of $L_m$ and $C_m$ can be ignored. With reference to the example given above, the total resistance is now $R_m + R_s = 10.4 \Omega$. The motor current is therefore as follows:

$$I_m = \frac{T_F + T_L}{K_T} = \frac{1.04}{3} = 0.34667 \text{ amps., and}$$

$$I_m(R_m + R_s) = .34667 \times 10.4 = 3.6053 \text{ volts.}$$

Thus, $$E_m = E_s - I_m(R_m + R_s) = 12 - 3.6063 = 8.3957 \text{ volts.}$$

But $$I_m R_s \times 1 + 0.34667 = 0.34667 \text{ volts.}$$

If $E_A$ is increased to set $E_m = E_s$, perfect speed/load regulation will result. This means that amplifier 21 should have its gain set to amplify $I_m R_s$, its input, to $I_m(R_m + R_s)$. As a result $E_s - E_m = 0$ and from equation (9):

$$R_m = \frac{E_s - E_m}{I_m} = 0.$$

In addition, the shaft speed has been increased to 5217 rpm, and this is due to the fact that the effect of friction torque has been cancelled as well.

Figure 3:
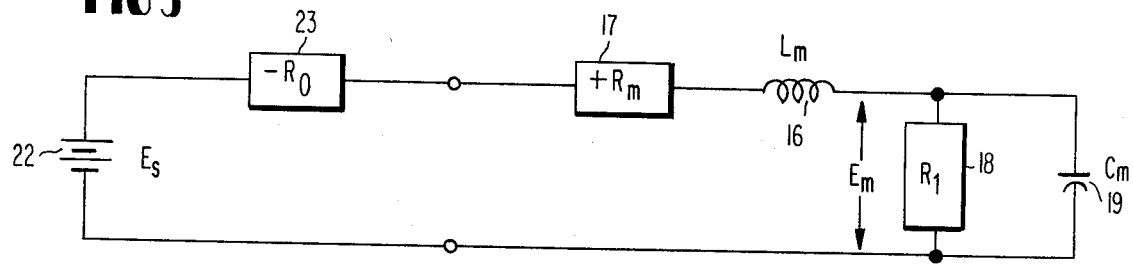
FIG. 3 is a simplified schematic diagram of the prior art constant speed control shown in FIG. 2.

The system shown in FIG. 2 can be considered a voltage source 22 in series with a negative resistance 23 to cancel the armature resistance 17 as shown in FIG. 3. The inductor 16, resistor 18 and capacitor 19 correspond to components 16, 18 and 19, respectively, in FIG. 2. Now if the resistance value of resistor 23 is $-R_o$ and the resistance of resistors 23 and 17 are summed, $R_m - R_o = 0$ and $E_m = E_s$, and load independent speed is maintained due to the following steady-state relationships:

$$\left. \frac{\delta \omega}{\delta T} \right|_{E_s = \text{constant}}, \text{ and } \Delta \omega = -\left( \frac{R_m - R_o}{K_T K_V} \right).$$

Figure 4:
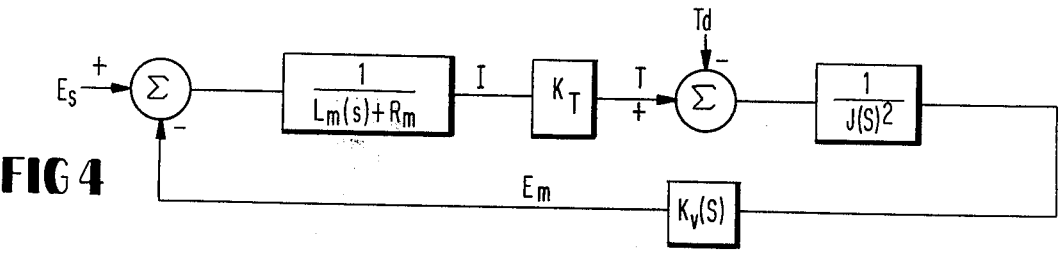
FIG. 4 is a Laplace transform diagram of the D.C. motor.

The problem with this prior art solution, however, is that if $R_m - R_o < 0$, the system becomes a negative resistance oscillator. To avoid this from happening, it is necessary to carefully adjust the loop gain constants to the constants of the particular motor being used to maintain stable operation. Actually, the stability criteria are more demanding when the dynamic response is considered. With reference to FIG. 4, the motor transfer function is examined in the complex frequency domain where $s = \sigma + j\omega$. FIG. 4 is a Laplace transform diagram of the motor where J is inertia and $T_o$ is torque disturbance due to load. From this diagram, the following equations can be written:

$$G(s) = \frac{K_T K_V(s)}{(L_m(s) + R_m)J(s)^2} \cdot \text{and} \tag{10}$$

$$GH(s) = \frac{K_T K_V}{JL_m(s)^2 + JR_m(s) + K_T K_V} \tag{11}$$

One can see that if the first order term of the denominator GH(s) becomes zero, as when $R_m - R_o = 0$, the system will oscillate at a frequency determined by:

$$s = 0 \pm j \frac{\sqrt{4K_T K_V JL_m}}{2JL_m} \tag{12}$$

Further, as $R_m - R_o$ approaches zero, the real part of the denominator in equation (11) becomes smaller, thus the control in FIG. 2 will exhibit greater over and undershoot and settling times in shaft speed for a given load disturbance, $T_o$. The system dynamic response can be totally unacceptable as attempt is made to set $\Delta\omega$ to zero in the steady-state.

DESCRIPTION OF THE PREFERRED EMBODIMENTS

The present invention is a discontinuous system, periodically interrupting the motor power source and simultaneously sampling the motor back e.m.f. as the armature and/or load inertia cause the motor to act as a D.C. voltage generator. The sampled back e.m.f. is suitably modified to generate a feedback signal which automatically accounts for the characteristics of the particular motor being used and avoids the problems of oscillation encountered in the prior art. Since the system according to the invention automatically accounts for the motor characteristics, a general purpose speed control is provided which does not have to be analytically or empirically adjusted for optimum response with each of a plurality of motors.

The first two embodiments of the invention address the fact that the $(TR_m/K_V K_T)$ term of equation (5) is responsible for the load/speed variations and, if $R_m = 0$, no variation in speed due to loading will result. This is the same approach of FIG. 2 except that the back e.m.f. is sampled to adapt the loop constants to provide stable operation for any D.C. motor, or combination of motors, while minimizing the effective value of $R_m$.

Figure 5:
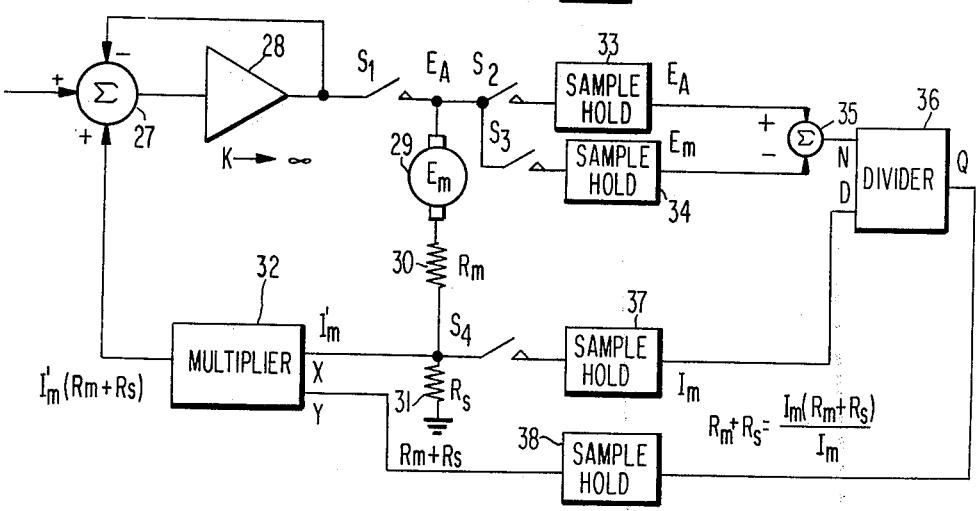
FIG. 5 is a block and schematic diagram of a first embodiment of the invention.

The first embodiment is illustrated in FIG. 5 and comprises a summing junction 27 to one input of which is applied a set point voltage $E_s$. The output or error voltage from summing junction 27 is applied to the input of operational amplifier 28, negative feedback being applied from the output of amplifier 28 to a second input of summing junction 27. The output of amplifier 28 is connected through normally closed switch $S_1$ to motor 29, which in turn is connected in series with resistors 30 and 31. The resistors 30 and 31 correspond to resistors 17 and 20, respectively, in FIG. 2, and the junction of these resistors is connected to the X input of a multiplier 32. The multiplier 32 is of conventional design and may be implemented using either analog or digital techniques. The product output P of multiplier 32 is provided as a positive feed back to a third input of summing junction 27.

The system described thus far is, of course, quite similar to FIG. 2, but as will become apparent, the multiplier 32 acts as an adaptive gain amplifier. This is accomplished by the rest of the circuitry shown in FIG. 5. More specifically, the junction between switch $S_1$ and the motor 29 is connected through normally open switch $S_2$ to sample and hold circuit 33 and through normally open switch $S_3$ to sample and hold circuit 34. The outputs of the sample and hold circuits 33 and 34 are subtracted in summing junction 35 to generate the numerator input N to divider 36. Divider 36, like multiplier 32, is of conventional design and may be implemented using either analog or digital techniques. The denominator input D to divider 36 is provided by sample and hold circuit 37 connected through normally open switch $S_4$ to the junction of resistors 30 and 31. Finally, the quotient output Q of divider 36 is provided by way of sample and hold circuit 38 to the Y input of multiplier 32.

In operation, switch $S_1$ is normally closed, and while closed, switches $S_2$ and $S_4$ momentarily close simultaneously so that the sample and hold circuits 33 and 37 store the values of $E_A$ and $I_m$, respectively. Immediately thereafter, switch $S_1$ momentarily opens and switch $S_3$ momentarily closes simultaneously with the opening of switch $S_1$. As a result, current is no longer supplied to motor 29 and the sample and hold circuit 34 stores the correct value of $E_m$. The stored value of $E_m$ is subtracted from the stored value of $E_A$ which according to equation (1), leaves $I_m(R_m + R_s)$. The stored value of $I_m$ in circuit 37 is then divided into the difference output of summing junction 35 to produce a quotient output from divider 36 which is equal to $R_m + R_s$. The value $R_m + R_s$ is stored in sample and hold circuit 38. Multiplier 32 produces a product signal equal to $I'_m(R_m + R_s)$, where the primed value of $I_m$ merely denotes its instantaneous value as distinguished from its sampled value in sample and hold circuit 37. Thus, it will now be apparent that the multiplier 32 acts essentially as a voltage controlled variable gain amplifier whose gain is periodically updated by the sampling operation thereby adapting the loop for operation with any motor or plurality of motors.

Figure 6:
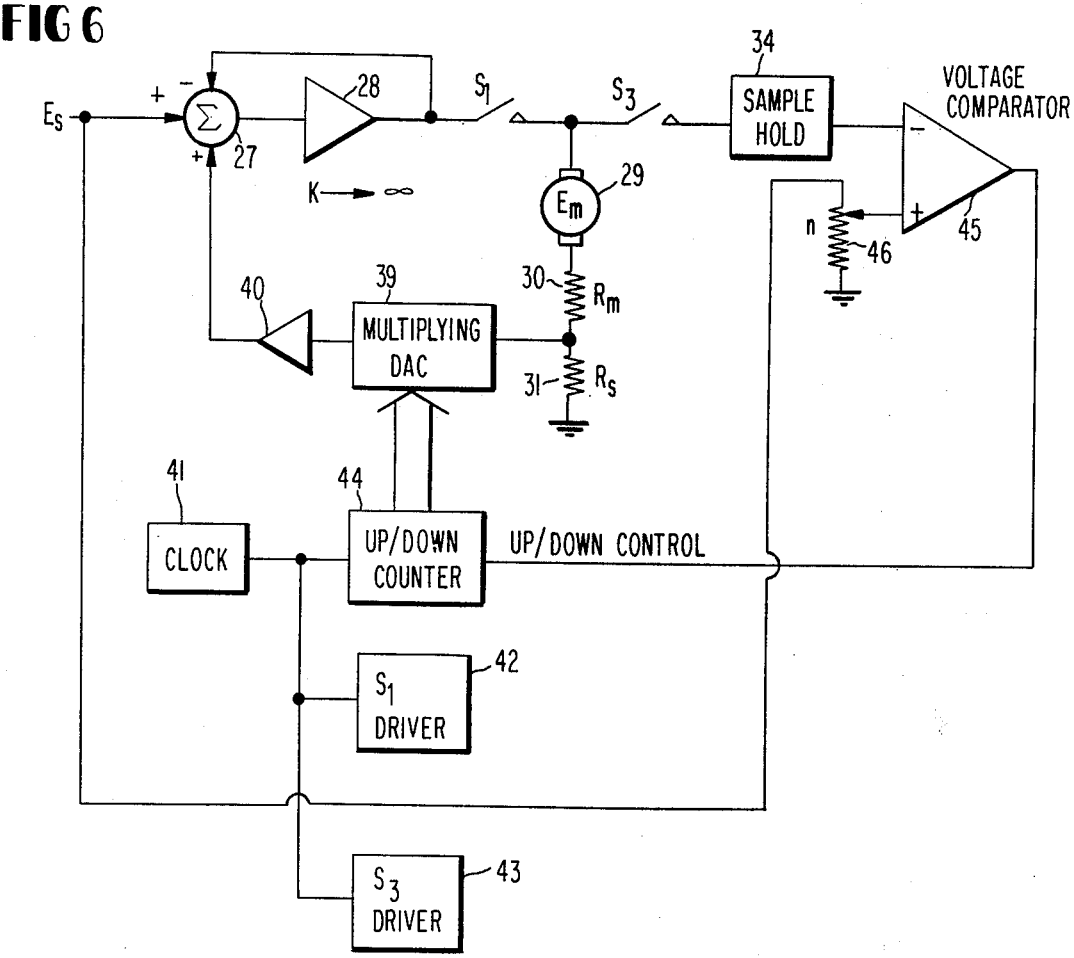
FIG. 6 is a block and schematic diagram of a second embodiment of the invention.

The second embodiment of the invention is a variation of the first and is shown in FIG. 6, wherein like reference numerals designate the same or corresponding parts. The multiplier 32, however, is replaced with a multiplying digital-to-analog converter 39 which receives its reference voltage from the junction of resistors 30 and 31. The analog output from converter 39 is amplified by constant gain amplifier 40 and positively fed back to summing junction 27. Switches $S_2$ and $S_4$ are eliminated, but switch $S_3$ periodically samples the back e.m.f. as before, and sample and hold circuit 34 stores the value $E_m$. Switches $S_1$ and $S_3$ are operated by clock 41 synchronously with up/down counter 44 through switch drivers 42 and 43, respectively. Counter 44 provides the parallel digital input to analog-to-digital converter 39. The up/down control for counter 44 is provided by the output of comparator 45. Comparator 45 has negative and positive inputs connected respectively to sample and hold circuit 34 and the wiper of potentiometer 46. The winding of potentiometer 46 is connected across the set point voltage $E_s$.

In operation, when switch $S_1$ is momentarily opened, switch $S_3$ momentarily closes to sample $E_m$. If $E_m$ is less than $E_s$, or some predetermined fraction of $E_s$ as determined by the setting of potentiometer 46, the up/down counter 44 increments thereby increasing the net gain of the $I_m R_s$ amplifier comprised of digital-to-analog converter 39 and fixed gain amplifier 40. These iterations will continue with each sample until $E_m = \eta E_s$, where $\eta$ is a ratio from zero to unity. Should $E_m$ become greater than $\eta E_s$, the counter 44 is controlled by comparator 45 to decrement thereby decreasing the net gain of the $I_m R_s$ amplifier. This provides the adaptive loop required.

To illustrate the effectiveness of the embodiments shown in FIGS. 5 and 6, assume that the positive feedback loop is set to force $E_m = 0.95 E_s$. Then the following computations can be made:

$$I_m = \frac{T_F + T_L}{K_T} = \frac{1.04}{3} = 0.34667 \text{ amps.},$$

$$I_m(R_m + R_s) = 3.6054 \text{ volts},$$

$$E_m = E_s - \frac{I_m(E_s - 0.95 E_s)}{I_m} = 11.4 \text{ volts, and}$$

$$\omega = \frac{E_m}{K_V} = 4956 \text{ rpm}.$$

Thus, the same motor that exhibited no-load to 1 oz.-in. load speed variation of 1362 rpm will, under the same operating conditions, exhibit a reduction in speed of only 207 rpm. As $\eta E_s \rightarrow E_m$, the regulation can be made better still.

Typically, a small motor will require a control loop bandwidth $\geq$ 1KHz. For 1KHz to be $0.1\omega_s$, the sampling frequency would have to be 10KHz. If there were to be a 90% power-on interval, the sampling aperture would have to be 0.1/10KHz or 10 $\mu$s. Motor electrical time constants are usually measured in milliseconds, the mechanical time constants in much larger intervals; therefore, dynamic compensation cannot be achieved by simply the use of back e.m.f. as a feedback signal in and of itself. While not necessary, the first and second embodiments of the invention can be improved by the use of a rate-limiter to provide a controlled linear rate of rise and fall in the applied motor voltage thereby obviating brush and armature damage due to switching transients.

From the foregoing, it will be appreciated that the present invention accomplishes precise D.C. motor speed/load control by using a sampler and hold circuit to make available the motor back e.m.f. as a feedback signal which is not dependent on motor characteristics for the loop dynamic response. The invention provides a positive feedback signal to make the effective motor resistance $R_m \rightarrow 0$.

What is claimed is:

1. In a D.C. motor speed control of the type wherein a set point voltage is applied to a loop summing junction to develop an error voltage which is amplified by an error amplifier and applied across the D.C. motor to be controlled, and a current metering device is connected in series with said D.C. motor to develop a voltage proportional to the current through said D.C. motor, which voltage is amplified by a second amplifier and positively fed back to said summing junction, the improvement comprising:
   a first normally closed switch connected between said error amplifier and said D.C. motor,
   a sample and hold circuit including a second normally open switch connected to said D.C. motor, said first and second switches being operated synchronously so that when said first switch is momentarily opened, said second switch is momentarily closed to sample the back e.m.f. of said D.C. motor, the value of the sampled back e.m.f. being stored in said sample and hold circuit, and
   said second amplifier being a voltage controlled variable gain amplifier whose gain is controlled by a function of the value of the sampled back e.m.f. stored in said sample and hold circuit.

2. The speed control circuit as recited in claim 1, further comprising:
   second and third sample and hold circuits including third and fourth normally open switches, respectively, said second sample and hold circuit being connected to said D.C. motor and said third sample and hold circuit being connected to said metering device, said third and fourth switches being closed momentarily just before said first switch is opened to sample the voltage applied across said D.C. motor and the current through said D.C. motor, respectively, the values of the sampled motor voltage and current being stored in said second and third sample and hold circuits, respectively,
   subtracting means connected to the first sample and hold circuit and to said second sample and hold circuit for producing a difference signal output,
   dividing means connected to said third sample and hold circuit for dividing said difference signal output by the stored current value for producing a quotient signal output, and wherein
   said second amplifier comprises multiplier means receiving as inputs a signal proportional to the current through said D.C. motor and said quotient signal output for producing a product signal output to said summing junction.

3. The speed control circuit as recited in claim 1, further comprising:
   comparator means connected to compare the value of the sampled back e.m.f. stored in said sample and hold circuit with a voltage proportional to said set point voltage, said comparator producing a control output signal depending on whether the value of the sampled back e.m.f. is greater than said voltage proportional to said set point voltage,
   up/down counter means counting at a fixed rate for providing a digital output signal and responsive to said control output signal to increment or decrement, and wherein
   said second amplifier comprises digital-to-analog converter means receiving as its input said digital output signal of said up/down counter means and as its reference voltage said voltage proportional to the current through said D.C. motor for producing an output signal to said summing junction.

4. The speed control circuit as recited in claim 3, further comprising a potentiometer having a winding connected across said set point voltage and a wiper connected to one input of said comparator means.

* * * * *